United States Patent
Bangham et al.

[11] Patent Number: 6,081,617
[45] Date of Patent: Jun. 27, 2000

[54] DATA PROCESSING METHOD AND APPARATUS

[75] Inventors: James Andrew Bangham, Norwich; Nigel Lawrence Bragg, Weston Colville; Robert William Young, Ely, all of United Kingdom

[73] Assignee: Cambridge Consultants Limited, Cambridge, United Kingdom

[21] Appl. No.: 08/981,599

[22] PCT Filed: Jun. 19, 1996

[86] PCT No.: PCT/GB96/01492

§ 371 Date: Mar. 23, 1998

§ 102(e) Date: Mar. 23, 1998

[87] PCT Pub. No.: WO97/01152

PCT Pub. Date: Jan. 9, 1997

[30] Foreign Application Priority Data

Jun. 20, 1995 [GB] United Kingdom .................. 9512459
Jul. 7, 1995 [GB] United Kingdom .................. 9513878

[51] Int. Cl.[7] .............................. G06K 9/34; G06K 9/46; G06T 5/00; G06T 7/60
[52] U.S. Cl. ....................... 382/173; 382/199; 382/203; 382/204; 382/260
[58] Field of Search ...................................... 382/275, 173, 382/204, 203, 205, 284, 288, 286, 263, 264, 260, 199, 195, 192

[56] References Cited

U.S. PATENT DOCUMENTS

| | | | |
|---|---|---|---|
| 4,183,013 | 1/1980 | Agrawala et al. | 382/173 |
| 4,991,224 | 2/1991 | Takahashi et al. | 382/204 |
| 5,048,096 | 9/1991 | Beato | 382/176 |
| 5,235,434 | 8/1993 | Wober | 382/272 |
| 5,424,783 | 6/1995 | Wong | 382/254 |
| 5,577,131 | 11/1996 | Oddou | 382/173 |
| 5,751,852 | 5/1998 | Marimont et al. | 382/203 |
| 5,867,593 | 2/1999 | Fukuda et al. | 382/173 |
| 5,995,668 | 11/1999 | Corset et al. | 382/173 |

OTHER PUBLICATIONS

J. Serra and P. Salembier, "Connected Operators and Pyramids", SPIE Proceedings vol. 2030, Jul. 12–13, 1993, pp. 65–76.

J. Crespo and R. Schafer, "Image Partition Using An Iterative Multi–Resolution Smoothing Algorithm", IEEE Int'l Conference, Mar. 23–26, 1992, pp. 561–564.

*Primary Examiner*—Scott Rogers
*Attorney, Agent, or Firm*—Lee, Mann, Smith, McWilliams, Sweeney & Ohlson

[57] ABSTRACT

In a data processing method and apparatus, an image signal representative of features in a space of two or more dimensions is progressively filtered at monotonically increasing filtering scales, the signal being input to the first filtering scale, and the input to the or each subsequent filtering scale is the output signal from the previous scale. Each input has a number of data samples each of which represents a respective region of the space, and at each filtering scale those samples are sorted into connected-sets, each of which contains a plurality of substantially equal value to data samples or a respective individual data sample not in other sets. The process then selects those connected-sets which contain data samples having values which are local maxima or local minima and which represent a composite region of a size related in a predetermined way to the current filtering scale. Each selected set is then effectively merged with the adjacent connected-set which contains data samples of a value closest to that of the sample(s) in the selected connected-set. This is achieved by changing the latter's value to that of the samples in the adjacent connected set. The output signal for the filtering method is derived from the output of at least one of the filtering scales. In at least one of those scales, both connected-sets having local maxima and connected-sets having local minima are selected, thereby increasing the tolerance of the method to noise.

41 Claims, 12 Drawing Sheets

DATA PROCESSING METHOD AND APPARATUS

FIELD OF INVENTION

This invention concerns methods and apparatus for processing data, particularly but not exclusively images, in order to separate the signal into two or more components having distinct characteristics, for example to separate different sized objects in an image or to remove a noise component from a signal. The invention is of particular application in the fields of image analysis, image compression, pattern recognition and the like.

BACKGROUND TO THE INVENTION

A common image processing operation is to segment an image into regions having distinct characteristics, such as the different objects in an image. For example, in an image compression scheme the image may be segmented into relatively large regions which can be described in terms of their boundaries and additional characteristics such as texture. This enables the image to be transmitted more efficiently. In pattern recognition and image analysis, an image may be decomposed into the major objects in the scene, and then information describing these objects, such as their edges, is passed to subsequent processing.

In order to separate an image into objects of different scale (size) it is common to perform a multiscale decomposition using some form of spatial filtering (for an extensive review see Lindeberg, 1994 Scale-space theory in computer vision"). In this approach, filters are used to produce images that have been filtered to a range of scales (so objects of smaller scale than the filter are attenuated or removed). The advantages of these multiscale representations crystallised in the 1980's when the concept of 'scale-space' emerged (Witkin, 1983, "Scale space filtering" 8th Int Joint Conf Artificial Intelligence).

The key point about scale-space representations is that objects in a scene are usually represented by local intensity extrema (maxima or minima) bounded by edges. A large object can be located either by finding the corresponding extremum (zero crossings of the first derivative) or the corresponding edges (zero crossings of the second derivative). However, this is only reliable if the image is first smoothed with a filter in order to remove fine detail and noise. It is not sufficient to apply any filtering (convolution) operator for it is very desirable that the smoothing does not introduce any new extrema and that the intensity of fine scale features is attenuated monotonically as the filtering scale increases. This property is known as scale-space causality, and is fundamental to an effective scale-space decomposition for use in image analysis etc. Furthermore, most filtering operators do not achieve scale space causality.

Initially, attention was focused on one dimensional signals and it was shown that the only linear (convolution) filters that exhibit this scale space property are Gaussian (diffusion equation related) convolution filters (Yuille and Poggio, 1987 "Scaling Theorems for Zero Crossings", IEEE Trans on Pattern Analysis and Machine Intelligence 9:15–25). Gaussian convolution, implemented as a set of increasing scale difference of Gaussians, Laplacian of Gaussians etc, had already been proposed as a way to decompose a two-dimensional image into a number of scale related "spatial" channels (Marr 1982 Vision" W. H. Freeman and Co). These methods were used to segment an image into regions and, by higher level classification stages, to analyze the image content. However, they only approximated the scale-space causality property for multidimensional signals.

Later it was realised that Gaussian convolution in one dimension simply represents a particular solution to the heat or diffusion equation (Koenderink, 1984, "The structure of Images", Biological Cybernetics 50:363:370). Solving these equations using a 2-D formulation leads to a method of performing a scale-space decomposition in 2-D that conforms to the scale-space causality property. This approach is known as 'diffusion based' imaging. However, there are problems with the diffusion based approach. The two most apparent ones are that: 1) At large scales the edges of objects are not well preserved, yet it is edges that are important for many tasks such as pattern recognition; 2) Diffusion based systems are computationally expensive, so are slow or extensive.

An additional branch of the literature that is relevant to the current invention is the behaviour of 'connected-set' operators that are used for the processing, coding and recognition of images (Serra, J and Salembier, P 1993, "Connected operators and pyramids" SPIE 2030:63–76). This paper considers the processing of zones of connected pixels of the same intensity value within an image. These form a partition of the image that can be represented as a graph. It also includes some discussion of the effects of morphological operators and other operators that depend on area, geodesic distance etc on connected sets. Some algorithms for the implementation of morphological operators on graphs have also been described (Vincent, L 1989 "Graphs and mathematical morphology" Signal Processing 16:365–388).

A feature of these papers is that they focus or configuring the filters in such a way as to provide apparent computational advantages (see also Vincent L. 1993 "Grayscale area openings and closings, their efficient implementation and applications to signal processing" eds. Jerra and Salembier pages 22–27, ISBN 84-7653-271-7, and Vincent L. 1992 "Morphological area openings and closings for Grayscale images" Proc. NATO Shape in Picture Workshop Driebergen, Springer Verlag pages 197–207).

However, as a result, such filters (known as opening and closing filters) have been found to be sensitive to image degradations, such as noise, which can be of either positive or negative polarity.

Clearly, it would be desirable to provide a filter which is more robust to signal degradation but which presents no significant increase in computational demands compared with these previously proposed filters.

A technique for data processing, related to the current invention, has been described inter alia in PCT/GB94/00080. This describes an alternative method for performing a scale-space decomposition using ordinal value filters (such as median, erosion, dilation, opening, closing, open-close and close-open operators) at each filtering scale, called a 'Datasieve'. In this method, the signal or image is passed through a cascade of ordinal value filters of increasing filtering scale such that the output of one filter feeds the input to the next filter in the cascade. We have proved that when applied to one-dimensional signals these methods conform to scale space causality and have other attractive properties such as resilience to noise and the ability to retain the edge definition of larger scale features. It can be shown that each filter in the cascade removes extrema in the signal that have extent equal to the current filtering scale.

However, when the Datasieve, as described in the above patent application, is applied to multidimensional signals (either by applying 1-D filtering at multiple orientations or by applying multi-D filtering using multi-D ordinal value filters), scale-space causality may not be preserved, and consequently this form of decomposition is sometimes not ideal in terms of its ability to reliably segment an image into different objects. An additional problem with filtering using multidimensional ordinal value filters is that sharp corners of objects tend to be removed by the filtering at a lower scale than the main body of the object, which is unsatisfactory for image analysis applications (though this problem has been addressed by reconstruction filters (Salembier P. and Kunt M. "Size sensitive multiresolution decomposition of images with rank order based filters" Signal Processing 27 (1992) 205–241)).

It is an object of the present invention to provide an improved method and apparatus for processing multidimensional signal that does not suffer from these particular disadvantages.

SUMMARY OF THE INVENTION

The present invention provides a method for filtering multidimensional signals comprising the following steps:

(1) Progressively filtering the signals at monotonically increasing filtering scales from S1 up to S2, the input signal to the first filtering scale being the original input signal to the filtering process, while the input signal to each subsequent filtering scale is the output signal from the previous filtering scale, (2) At each filtering scale identifying connected-sets of equal valued data samples in its input signal that represent local maxima and minima, also referred to as extrema, (ie. connected-sets whose value is either greater than (maxima) or less than (minima) the values of all of the adjacent connected-sets) and whose area is related in a predetermined way to the current filtering scale, and for each such extremum:

(3) Identifying the adjacent connected-set whose value is closest to the current value of the extremum, and (4) Modifying the value of the connected-set that forms the current extremum such that its new value is equal to the value of the adjacent connected-set identified in (3) so that the adjacent connected-set becomes merged with the current extremum forming an extended connected-set of larger area, and outputting the output signal from at least one of the filtering scales, wherein for at least one of the filtering scales both maxima and minima in the input signal, to that filtering scale, are processed.

Preferably, both maxima and minima are processed at each filtering scale.

It has been found that processing both maxima and minima at each filtering scale, rather than just maxima or just minima, has the advantage that the filtering technique becomes more robust to signal degradations, such as noise, than the technique employed by opening and closing filters.

Although processing both maxima and minima night be considered significantly to increase the computational demands imposed by the method of the present invention compared with opening and closing filters, this has been found not to be the case. It is believed that the demands associated with having to process both maxima and minima at a current filtering scale are offset by the fact that the signal fed to the next scale apparently requires less processing than would be the case if only maxima or only minima were processed at the current scale. In addition, with the method of the present invention, it is not necessary to sort the connecting-sets neighbouring any given extreme into order by value.

In general, the extrema that need to be processed at each filtering scale are preferably processed in any convenient order, for example in an order chosen to minimise computation.

Changes to the connected-sets due to filtering may advantageously be made directly to the data held in the memory holding the input information to the filtering scale, rather than being stored in a separate output buffer. This is effectively a recursive filtering technique, and it has been found that it provides at least as good performance while requiring less computation and memory.

For some applications, it may be advantageous to process the extrema in an order that is defined by their position in the input signal.

In other applications, it may be beneficial to process all the maxima that require processing at a given filtering scale before processing the minima at that scale, or vice versa.

Output parameters describing a 'granule' that represents the shape of the original extremum and the change in value of the extremum due to filtering, may be supplied as a first output signal.

Once all the extrema that need to be filtered at the current filtering scale have been processed, the filtered signal may be supplied as a second or as an alternative output signal.

The effect of the method is to filter extrema when their area satisfies some criteria related to the current filtering scale, such that the connected-set of data samples that forms the extrema takes on the value of an adjacent region selected so that the absolute change in value of the extrema is minimized. As the filtering scale increases, detail in the signal will in general be removed as the size of the connected-sets that form extrema increases.

Taking the example of an image containing a number of objects, represented by extrema, the objects are removed from the image once the area of each object satisifies the filtering scale related criterion.

One filtering scale related criterion which may be used is when the area becomes equal to the "area-equivalent" of each filtering scale.

It is also be to be understood that the "equal value" criterion which identifies connected-sets of data samples may be any suitable parameter of the signals which are to be filtered such as amplitude, intensity etc. For example, when filtering a digitised image, the intensity of each image pixel can be used. The invention also includes the use of connected-sets that are regions of data samples with values lying in a certain range (and so not necessarily of the same value).

It is also to be understood that the relation between the area of an extremum and the current filtering scale that determines whether filtering is required includes relations such as "equal to""less than", "less than or equal to", "greater than", "greater than or equal to".

Parameters other than the area of an extremum may be used to determine whether the extremum is processed at a given scale. Alternatives include perimeter, width, height (or 'length' in any particular direction), moments about some point, often the centre of gravity, greatest distance between any two points in the region, geodesic distance etc or any combination of these (including area), but in general any parameter or combination of parameters that is some measure of the size and/or shape of connected-set may be used.

For three dimensional signals, the volume of a connected-set may be used to determine at what scale an extremum is filtered.

For higher dimensionality signals, a higher dimensional equivalent of volume may be used.

Note that the number of data samples in a connected-set may be used as a measure of its area or volume. Similarly, distance measures such as perimeter, width, height and length may also be represented by counting a number of data samples.

Thus, it will be appreciated that reference to the area, volume or size of a connected-set are references respectively to the area, volume or size of the region represented by the single sample in that set or (if the set has a plurality of samples) of the composite region defined by the adjoining regions represented by the data samples in the set.

The amplitude or intensity of the extremum and/or adjacent regions may also be used in the criterion that determines whether an extremum should be filtered at a given filtering scale. For example, the criterion may be based on both the area of the extremum and the difference between the value (amplitude) of the extremum and value of the closest value adjacent connected-set. In such a method, the filtering scale at which an object is removed from the input signal depends both on its size and on its contrast relative to surrounding objects.

It is to be understood that any of these alternative measures describing a connected-set may be used in place of or in combination with area in the aforesaid method.

The measure may be chosen to be directional, such as width or height, in order to produce a directional filtering effect. Typically the measure chosen is one which always increases when two regions are merged. In this manner, the invention provides an effective method to separate objects of different sizes and/or shapes in a signal.

In step 3 of the method according to the invention, it may arise that there are a number of connected-sets adjacent to the extremum that are equally close to the value of the extremum. Clearly for this to be the case, these adjacent connected-sets will all be of the same or substantially the same, value. In this case, either all these connected-sets may be merged with the extremum to form a single region whose area is the sum of the areas of all the merged connected-sets, or alternatively, only one of the regions may be merged with the extremum at this filtering scale, with the other regions being merged at higher filtering scales.

In a further enhancement to the method of the invention, it may be advantageous when filtering an extremum, to merge any adjacent connected-sets that lie within a range of values, rather than just the connected-set that is closest in value to the extremum value. The filtered value of the extremum may be any function of the values of the adjacent connected-sets with which it is merged.

The invention also provides a method for performing a scale-space decomposition of an input signal which conforms to the scale-space causality property that requires features in the image to be attenuated monotonically as the filtering scale increases, since the filtering process always involves the merging of pairs of adjacent connected-sets. Thus the method of the invention provides a reliable method for simplifying a signal.

When the invention is used in a 'low-pass' mode, typically for noise reduction or to remove features below a certain size, filtering is performed up to a predetermined scale, and then the filtered signal which will contain less fine detail is output to any subsequent processing or to a display (after conversion, if necessary, to an analogue signal).

When the invention is used in a 'band-pass' mode, for example to separate features in a certain range of sizes from other features, an output signal from one filtering scale is subtracted from an output signal from a different filtering scale, and the resulting signal is output to any subsequent processing or to a display (after conversion, if necessary, to an analogue signal).

When the invention is used in a high-pass' mode, in order to remove larger scale features, for example the background to an image, the output signal from one filtering scale is subtracted from the input signal, and the resulting signal is output to any subsequent processing or to a display (after conversion, if necessary, to an analogue signal).

When the invention is used in a 'decomposition' mode, in order to separate features into a number of different sizes, for example for pattern recognition purposes, then output signals are formed from a number of filtering scales, such that each output signal describes the location and/or change in value of any extrema that were processed at the corresponding scale, and the output signals are passed to any subsequent processing or to a display (after conversion, if necessary, to an analogue signal).

Connected-sets of data samples are classified in relation to the number of different directions in which connections between the samples can be effected. In general the sets will be referred to as N-connected sets, where N represents the number of different directions in which two samples may be connected. According to the chosen value of N, the filtering process will have somewhat different results. Typically N=4 or 8.

The invention also provides a method of filtering as aforesaid in which the criterion for a connected set to be filtered at some filtering scale is not that they define an extrema, but that they contain saddle-points, form watersheds, or contain maxima and/or minima in one or more directions. After filtering, the new value of a filtered connected-set may be equal to the value of an adjacent connected-set. However if so absolute change in value of the filtered connected-set is minimized.

The invention also provides a method of filtering in which connected-sets that belong to any selection of the above categories (including extrema) may be filtered.

The invention also includes apparatus for performing the method, comprising:

(1) First circuit means for identifying connected-sets of equal valued data samples in a signal.

(2) Second circuit means for determining whether a connected-set is an extremum by comparing its value with the value of adjacent connected-sets or adjacent data samples, (3) Third circuit means for determining the area of the extremum.

(4) Means for determining when processing is finished, (5) Circuit means for determining whether an extremum requires processing, (6) Means for reading the values of the data samples or connected-sets that are adjacent to an extremum, (7) Means for determining which adjacent connected-set is closest in value to the extremum value, (8) Means for modifying the value of an extremum to that of the closest valued adjacent connected set, (9) Means for outputting a signal following filtering at a predetermined scale.

Typically, the apparatus will include input and output buffers control circuitry and additional memory for storing intermediate results and other information used in the processing.

The means for determining when processing is finished may alternatively comprise a counter for holding the current filtering scale and means for comparing the current filtering scale with the maximum filtering scale.

The means for determining when processing is finished may comprise means for determining the minimum area of any extremum and means for comparing this area with the maximum filtering scale.

The means for determining whether an extremum requires processing may comprise means for comparing the area of the extremum with a filtering scale.

The means for determining whether an extremum requires processing may comprise means for holding extrema of different areas in different lists, such that only the list corresponding to a particular scale needs to be processed at that scale.

The means for outputting a signal following filtering at a predetermined scale may employ a comparator to determine when the desired filtering scale has been reached.

Parameters other than the area of an extremum may be used to determine whether the extremum is processed at given scale. Alternatives include perimeter, width, height (or "length" in any particular direction), moments about some point, often the centre of gravity, greatest geodesic distance between any two points in the region, geodesic distance etc or any combination of these (including area), but in general any parameter or combination of parameters that is some measure of the size and/or shape of a connected-set may be used. To this end the area determination means referred to above may alternatively be a means for determining any one of the relevant parameters (or combinations of parameters) and the criteria employed in the later circuit elements may be adjusted accordingly.

For three dimensional signals, it may be the volume of a connected-set which may be determined and used to itself determine at what scale an extremum is filtered.

For higher dimensionality signals, the determining means may be set to determine a higher dimensional equivalent than volume.

Note that the number of data signals in a connected-set may be used as a measure of an area or volume.

Similarly, distance measures such as perimeter, width, height and length may all be represented by counting a number of data samples.

The amplitude or intensity of the extremum and/or adjacent regions may also be used in the criterion that determines whether an extremum should be filtered at a given filtering scale. For example, the criterion may be based on both the area of the extremum and the difference between the value (amplitude) of the extremum and the value of the closest value adjacent connected-set. In such a method, the filtering scale at which an object is removed from the input signal depends both on its size and on its contrast relative to surrounding objects.

It is to be understood that the determining means may be set to compute any of these alternative measures describing a connected-set in place of area.

Rather than filtering connected-sets that are extrema (both maxima and minima), the apparatus may be operated so as to process just maxima, or just minima, for at least one of the filtering scales. To this end, the means for determining whether a connected-set is an extremum, referred to above, may alternatively be means for determining whether a connected-set is a maximum, or a connected-set is a minimum.

Alternatively, all extrema may initially be identified, but additional value checking means may be provided, adapted to determine if an extremum is a maximum or a minimum, thereby to determine if processing of the extremum is required.

In order to improve processing speed, additional storage means for storing information that describes the extrema found in the signal may be present. The storage means may be used to hold (directly, or indirectly through the use of pointers to other areas of memory) any or all of the following data: the location of at least one of the data samples in the extremum; a list of the locations of all the data samples in the extremum; the area of the extremum; the value of the extremum; a list of other connected-sets or data samples that are adjacent to the extremum; a flag that indicates whether each extremum is a maximum or a minimum. Potentially, extrema of different areas can be stored in separate lists, or alternatively, the list of extrema can be ordered so extrema of lower area appear in the list before extrema of higher area. It may also be advantageous to store extrema that are maxima in one list and extrema that are minima in another list.

In order to further improve processing speed, additional storage means for storing information that describes the connected-sets found in the signal may be present. The storage means may be used to hold (directly, or indirectly through the use of pointers to other areas of memory) any or all of the following data: the location of at least one of the data samples in the connected-set; a list of the locations of all the data samples in the connected-set; the area of the connected-set the value of the connected-set; a list of other connected-sets or data samples that are adjacent to the connected-set; a list of data samples that are contained within the connected-set and lie along the perimeter of the connected-set, possibly including a flag for each such data sample to indicate in which direction a data sample from a neighbouring connected-set can be found.

In order to further improve processing speed, additional storage means may be present in order to identify the connected-set to which each data sample in the signal belongs at each stage in the processing.

It may be advantageous to store information describing the extrema in a list that is ordered in terms of increasing extremum area. In this case the first extremum in the list is always the next extremum to be processed, unless its area is too large to be filtered at any of the predetermined filtering scales. In this technique, it may not be necessary to use an explicit counter to loop over the filtering scales; it is simply necessary to check whether the area of the first extrema in the list is greater than the maximum filtering scale, in which case processing can cease.

It may also be advantageous to perform filtering at the lower filtering scales by operating directly on the input signal, before the signal is transformed to a representation involving connected-sets. For example, filtering at scale 1 can be achieved by considering each data sample in turn, and comparing the value of the data sample with the adjacent data samples to determine if it represents an extremum. If it is an extremum, then its value is modified to become equal to the value of the closest value adjacent data sample. Typically, the values in the input buffer are modified directly when an extremum is filtered in this way rather than generating an output signal in a separate output buffer. A similar method can be used to perform filtering at scale 2 and higher scales, although the complexity is greater. After filtering up to the desired scale using this approach, the output signal from the last filtering scale is passed to the connected-set based approach described above which is more efficient for higher filtering scales.

Potentially, a programmable processor, controlled by a computer program and with associated memory can be used for part or all of the apparatus, as an alternative to using dedicated hardware circuits.

BRIEF DESCRIPTION OF THE DRAWINGS

The invention will now be described, by way of example only, with reference to the accompanying drawings, in which.

DETAILED DESCRIPTION

Figure 1:
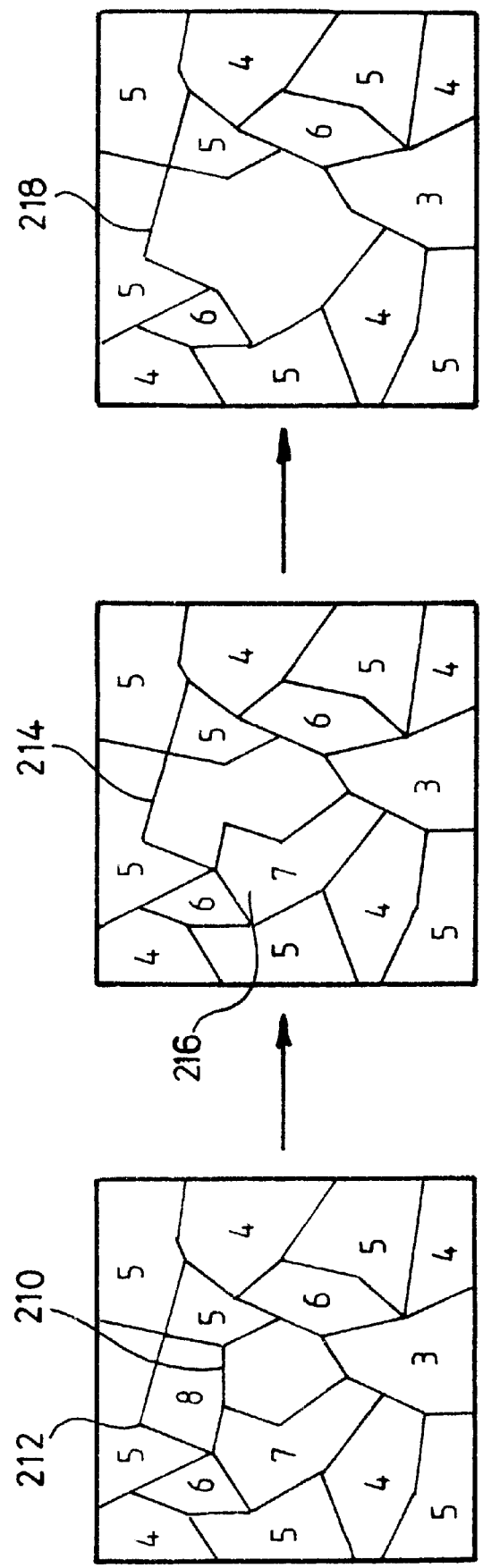
FIGS. 1A–1C show three simplified representations of a two-dimensional image and illustrates the effect of two filtering operations, by a method according to the invention, thereon.

Typical processing is illustrated in FIG. 1 which shows the effect of filtering on a simple two-dimensional image. The image is shown diagrammatically in three frames: frame A before any processing; frame B after filtering to a first scale and frame C after filtering to a larger scale. The lines show the partition of the image into connected-sets of pixels, each pixel being represented by a respective data sample. All the samples in each set have the same respective value (marked on the regions). In this example, that value corresponds to intensity of the pixels.

In frame A, the shaded region 210 is a connected-set which constitutes an extremum (local maximum in this case) of value 9. After filtering at the first scale (according to area) the extremum is merged with an adjacent region 212 to form a larger set (which also happens to be an extremum) 214 of value 8 as illustrated in frame B. Subsequent filtering at a higher scale leads to the enlarged extremum 214 being merged with another adjacent region 216 to form a further extended extremum 218 of value 7, as shown in frame C.

Figure 2:
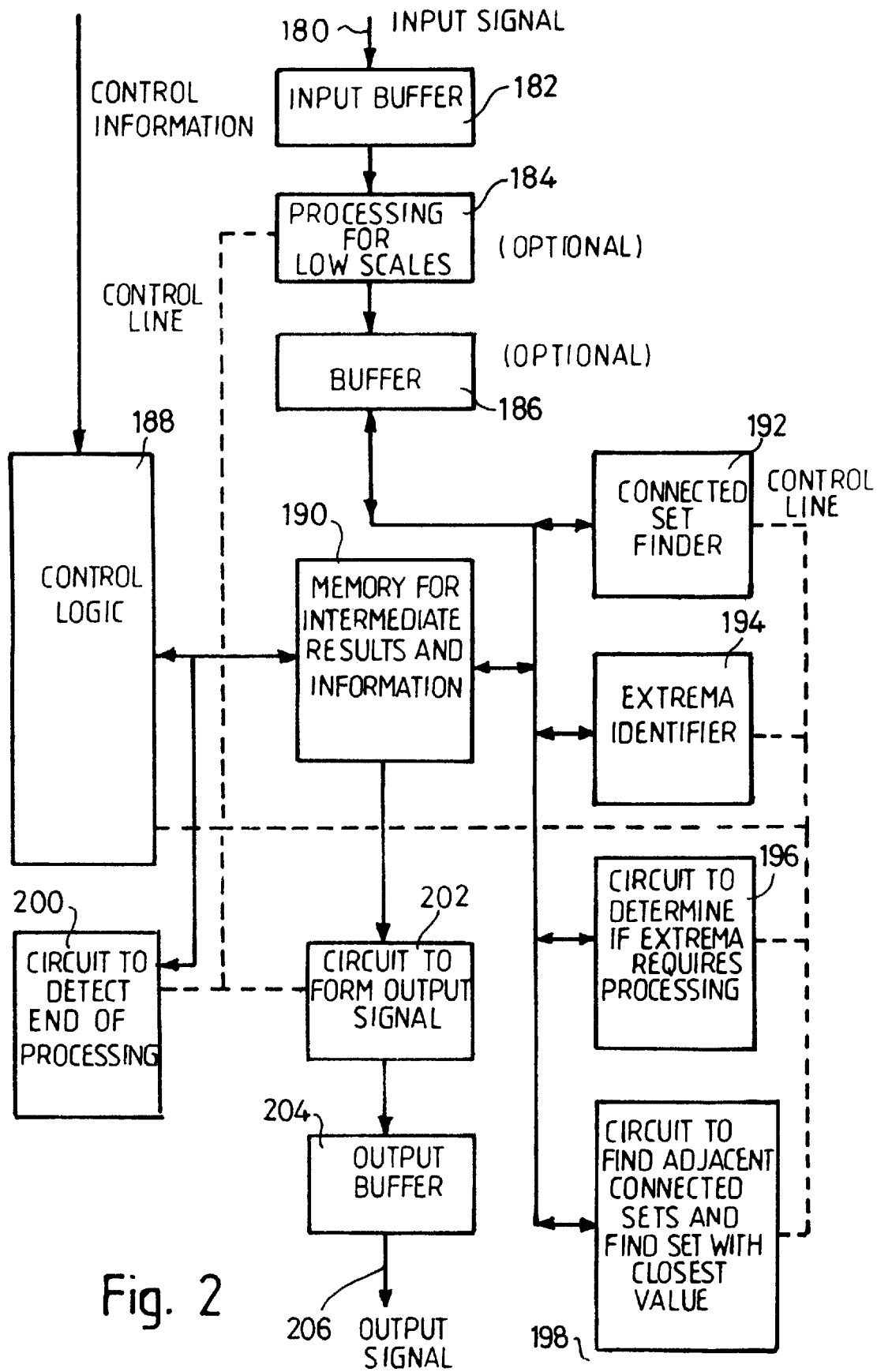
FIG. 2 is a block diagram of apparatus for performing said method.

Apparatus for performing the method is illustrated in FIG. 2. This apparatus comprises connected-set finder circuitry 192 for finding connected-sets of equal valued data samples in a signal, and for determining the area of connected-sets, extrema identifier circuitry 194 for determining whether a connected-set is an extremum by comparing its value with the value of the adjacent connected-sets or adjacent data samples, and circuitry 200 for detecting the end of the processing, by determining the minimum area of any extremum and comparing this area with the maximum filtering scale to determine if processing is finished.

An alternative version of the circuitry 200 includes a counter for holding the current filtering scale and means for comparing the current filtering scale with the maximum filtering scale to determine if processing is finished.

The apparatus also includes circuitry 196 for determining whether an extremum requires processing using means for comparing the area of the extremum with filtering scale. In an alternative embodiment, the circuitry 196 has means for holding extrema of different areas in different lists, such that only the list corresponding to a particular scale needs to be processed at that scale. The apparatus also includes circuitry 198 for reading the values of the data samples or connected-sets that are adjacent to an extremum. The circuitry 198 determines which adjacent connected-set is closest in value to a given extremum value, and modifies the value of that extremum so as to merge it with that adjacent connected-set.

The apparatus also includes a memory 190 which is connected to an input 180 via an input buffer 182 and optionally circuitry 184 for low scale processing (described below) and optionally a further buffer 186. The units 192, 194, 196 and 198 are all also connected to the memory 190, and each is able to read from the memory 190 the image data needed to perform its respective processing of the data and to write the results of that processing into the memory 190. The memory 190 is thus operable to store the intermediate results of the method and other information used therein.

An output signal for the apparatus is formed by circuitry 202 which obtains the necessary data for that signal from the memory 190, and is connected to an output 206 via an output buffer 204. Buffer 204 enables the apparatus to be interfaced with subsequent processing equipment, for example, an image display unit.

The operation of the apparatus is controlled by a ('control logic') unit 188 which can receive image data from the memory 190, and which supplies control signals to various of the other units of the apparatus (and receives status signals from those units), as indicated by broken lines.

In use, the input 180 receives a signal for an image scan line by scan line, and the data for each scan line is stored in the input buffer 182 until the data for the whole image has been received. In the versions of the apparatus which lack the units 184 and 186, that data is then fed directly to the memory 190.

The unit 188 then initiates the operation of the circuitry 192 which reads that data from the memory, identifies the connected sets of data samples, calculates the area of each connected-set (ie the areas of the regions in the image defined by the connected-sets), and writes data describing those sets into the memory 190.

The unit 188 then causes the extrema identifier circuitry 194 to obtain from the memory 190 data describing the image and the connected-sets, and to compare the intensity of each connected-set with those of its neighbours to determine which sets are extrema.

The circuitry 194 then supplies data describing the extrema to the memory 190, from which that data is then read by the circuitry 196, in response to a control signal from unit 188.

The circuitry 196 also receives data relating to the current filtering scale from the unit 188, and compares each extrema with that scale to identify which have areas which are less than the area required by the scale. Data identifying those extrema are then written into the memory 190.

The circuitry 198 is then caused by the unit 188 to read from the memory 190 data describing the positions of the regions defined by the connected sets and identifying the extrema having areas less then that specified by the current filtering scale. The values of those extrema are then modified as described above, and data describing the image after filtering at that scale is stored in the memory 190.

If required, that data can be converted into an output image signal by circuitry 202 and the output buffer 204 and/or is used as the basis for filtering at the next scale. The data is also fed to the circuitry 200 which, under control of the unit 188, determines whether the image has been filtered to the largest scale, ie whether the processing performed by the apparatus has finished.

If that processing has not been finished, the above processes are repeated for each successive filtering scale, using the data obtained as a result or the processing at the previous scale. The data identifying each scale is supplied by the processor 188 to the circuitry 196 when the image is to be filtered at that scale.

At each scale, the value of an extremum is modified using 198, 188, and following filtering at a predetermined scale a signal is output using a comparator (effectively units 188 and 202) to determine when the desired filtering scale has been reached.

Typically, the apparatus also includes input and output buffers 182, 203; control circuitry 188; and additional memory for storing intermediate results and other information used in the processing 190.

It may also be advantageous to perform filtering at the lower filtering scales by operating directly on the input signal, before the signal is transformed to a representation involving connected-sets. For example, filtering at scale 'one' can be achieved by considering each data sample in turn, and comparing the value of the data sample with the adjacent data samples to determine if it represents an extremum. If it is an extremum, then its value is modified to become equal to the value of the closest value adjacent data sample. Typically, the values in the input buffer are modified directly when an extremum is filtered in this way rather than generating an output signal in a separate output buffer. A similar method can be used to perform filtering at scale 2 (ie to remove or attenuate extrema occupying two or fewer pixels) and higher scales, although the complexity is greater. After filtering up to the desired scale using this approach, the output signal from the last filtering scale may be passed to a connected-set based approach described above which is more efficient for higher filtering scales. A circuit 184 performs this filtering and an associated buffer 186 enables the circuit 184 to interface with the rest of the apparatus.

As already mentioned, a programmable processor, controlled by a computer program and with associated memory can be used for part or all of the apparatus, as an alternative to using dedicated hardware circuits.

Figure 3:
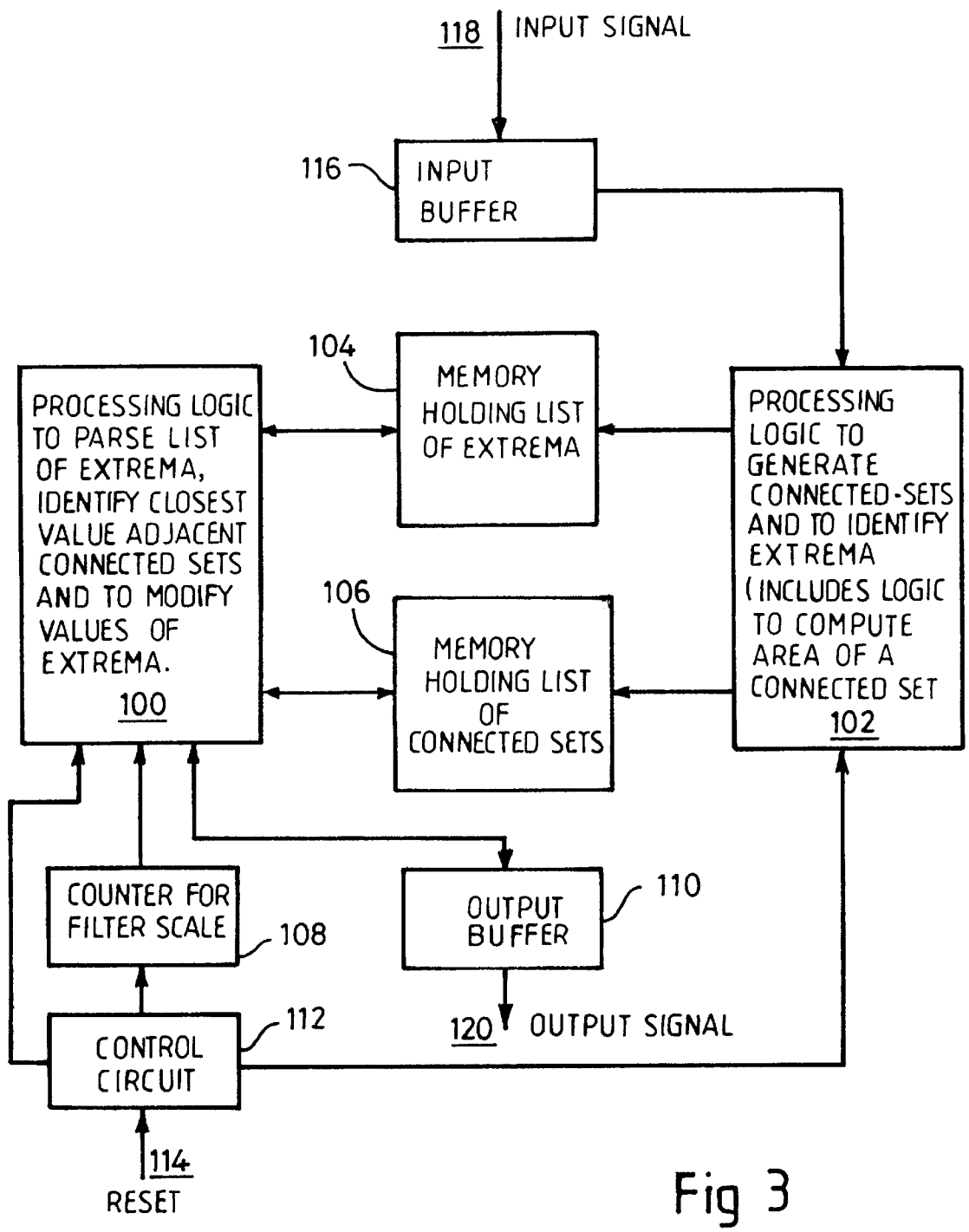
FIG. 3 is a block diagram of another embodiment of apparatus for performing the method.

FIG. 3 shows another circuit for performing the invention that incorporates some of the improvements described above. The input signal 118 is buffered in the input buffer 116. The control circuitry 112 triggers the processing logic 102 that generates lists of connected regions (ie 'connected-sets') and lists of extrema and stores the associated information on the extrema in the memory 104 and on the information on the connected regions in memory 106 for later processing. When this is completed, the control circuitry 112 resets the filtering scale counter 108 to the first filtering scale. The processing logic 100 searches the extrema list for extrema of area (or another parameter describing size and/or shape) equal to (or some other relation) the current filtering scale. This extremum is then processed by 100 and the new values of the connected-set written to the memory 104 and 106, as necessary. After processing at each filtering scale, the control logic 112 determines if an output signal should be fed to the output buffer 110 (which provided an interface with a subsequent data processor or with a display). It also determines if the filtering scale has reached the maximum filtering scale, in which case processing ceases. Note that the filtering scale counter 108 is optional; some implementations may, at each filtering scale, determine the extremum with the minimum area using the processing logic 100 and process that extremum unless its area exceeds the maximum filtering scale as determined by the processing logic 100.

For low-pass filtering, means is required to output the filtered signal from the final filtering scale to give a low-pass output. This is contained within the extremum processing logic 100 using the output buffer 110.

For band-pass filtering, means is required to subtract the output signals from two different filtering scales, and to output the resulting band pass signal. This is contained within the extremum processing logic 100 using the output buffer 110.

For high-pass filtering, means is required to subtract an output signal from a predetermined filtering scale from the original input signal, and to output the resulting high pass signal. This is contained within the extremum processing logic 100 using the output buffer 110.

To perform a signal decomposition, means is required to subtract the filtered value of an extremum from the previous value of the extremum to determine the change in value of the extremum and to output a signal containing at least this information. This is contained within the extremum processing logic 100 using the output buffer 110.

Figure 4:
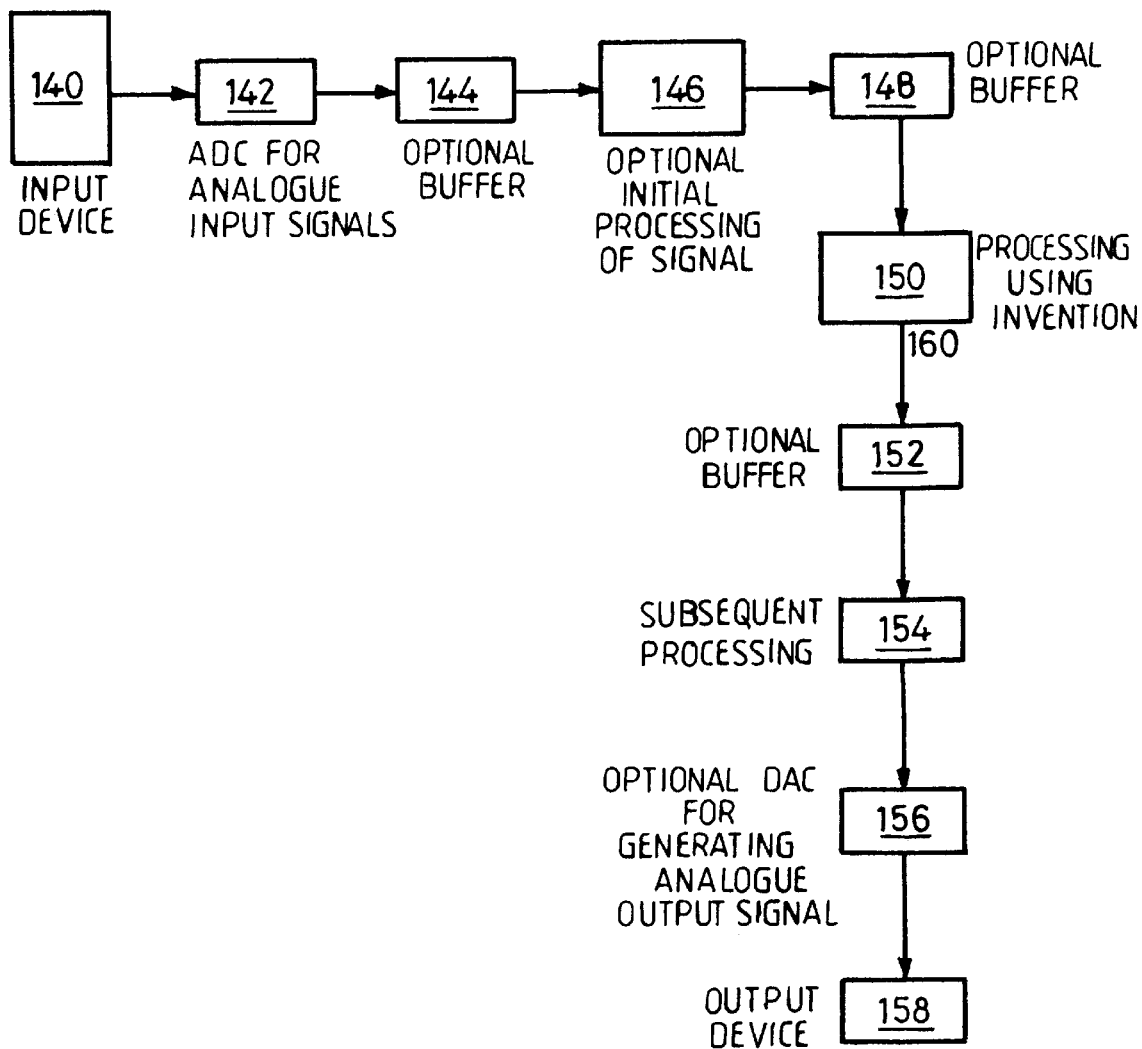
FIG. 4 is a block diagram of an image processing system which can incorporate the apparatus shown in FIGS. 2 or 3.

A general configuration of the invention, including input and output devices, buffering and pre and post-processing is shown in FIG. 4. The output 160 from the invention 150 may be any output signal derived from the invention, such as the low pass, band pass, high pass and decomposition information described previously (the apparatus required to norm the required output is contained within 150 and is either the apparatus shown in FIG. 2 or that shown in FIG. 3).

Examples of input devices 140 for delivering signals to the circuit are:
  an electronic scanning device (eg. a camera).
  an electronic sensing device or transducer measuring any physical phenomenon (eg. a microphone or light meter).
  a receiver for any type of communications channel, using any communications medium (eg. optical fibre, wire or any other means of energy guidance; radio, infra-red or any other means of free-space communication; sonic, ultrasonic or any other means of broadcast communication using physical modulation of a physical medium).
  a storage device using any medium (eg. semiconductor, magnetic, optical).

Examples of output devices 158 driven by signals from the circuit are:
  Devices for control or activation of any physically measurable phenomenon (eg. a switch, or a display such as a TV monitor).

a transmitter for any type of communications channel, using any communications medium (eg. optical fibre, wire or any other means of energy guidance; radio, infra-red or any other means of free-space communication; sonic, ultrasonic or any other means of broadcast communication using physical modulation of a physical medium).

a storage device using any medium (eg. semiconductor, magnetic, optical).

For some input devices, an analogue to digital convertor 142 is required to convert the signals to a digitized form for processing by the invention. For some output devices, a digital to analogue convertor 156 is required to convert the output signals from the invention to an analogue form before being passed to the output device 158.

It should be noted that other (unspecified) buffers 144, 148 and/or initial processors 146 can be provided to process on the signal from the input device 140 before it is fed to the invention 150. Similarly, other (unspecified) processing at circuitry 154 and/or buffering at circuitry 152 can be performed on the output signal from invention before it is fed to the output device. Examples of processing that might be applied to the input signal are: noise reduction, contrast enhancement, linear or non-linear filtering. Examples of processing that might be applied after the invention are: pattern matching, pattern recognition, contrast enhancement, thresholding, edge detection, watershed transformation, linear or non-linear filtering, compression methods such as run-length coding, predictive coding, entropy coding etc.

Figure 5:
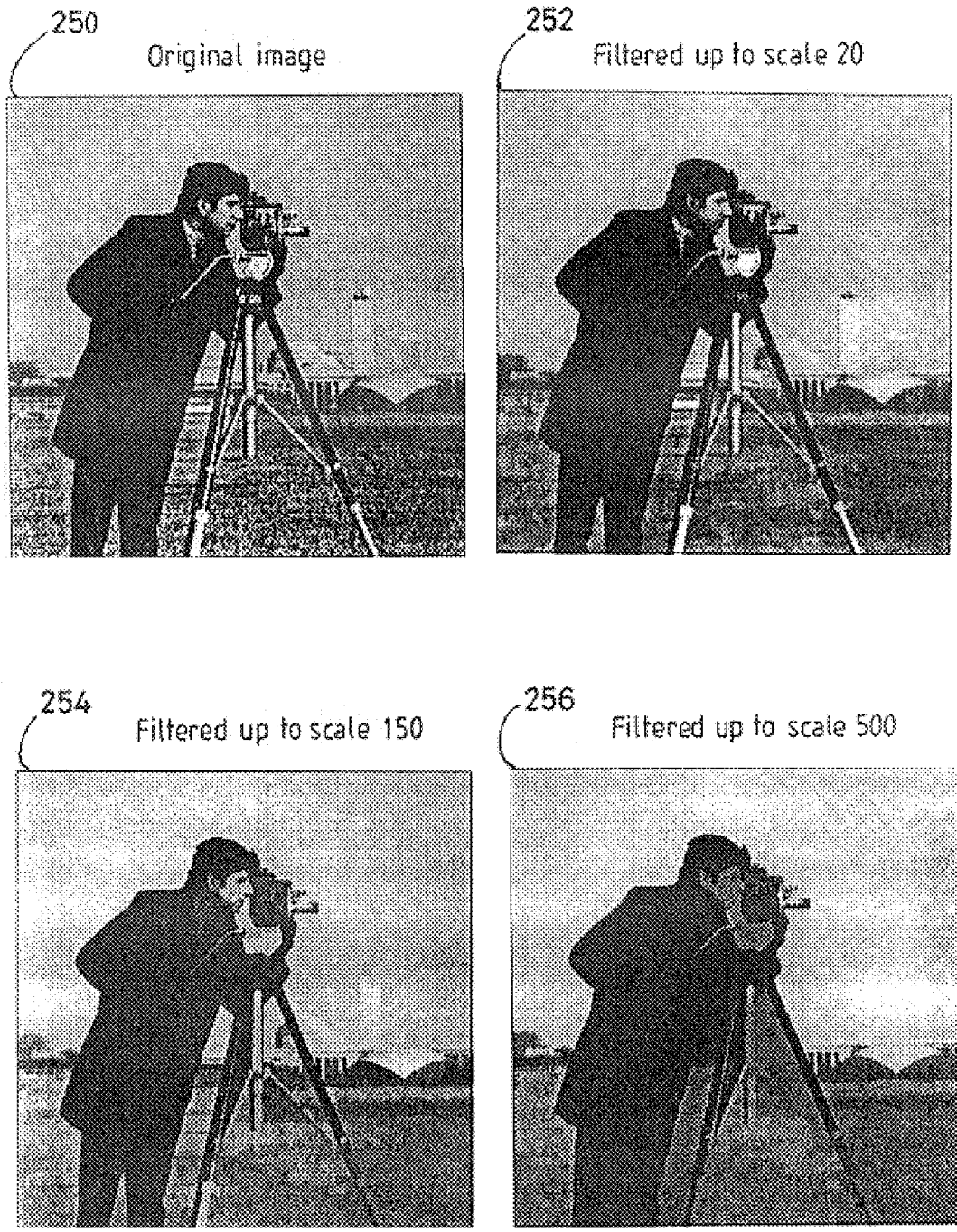
FIG. 5 shows a real image before filtering and after filtering at progressively increasing scales.

FIG. 5 illustrates the effect of filtering a real image using the invention. The top-left image 250 is the original image (without processing). The top-right, bottom-left and bottom-right images (respectively referenced 252, 254 and 256) show progressively increasing levels of filtering (ie the output images are obtained from the outputs of progressively higher filtering scales). Each scale is indicated above its respective image and corresponds to the maximum number of pixels (ie data samples) of any connected-set which will be selected at that scale. Image 252 is filtered to a scale of 20 pixels, image 254 to a scale of 150 pixels and image 256 to a scale of 500 pixels. The reduction in detail in the filtered images is clearly shown. This may be useful for applications such as a precursor to data compression (ie to provide the initial 'smoothing' referred to in the introduction of this specification, and pattern recognition where it is desirable to obtain a simplified image that only contains the major information in an image.

Figure 6:
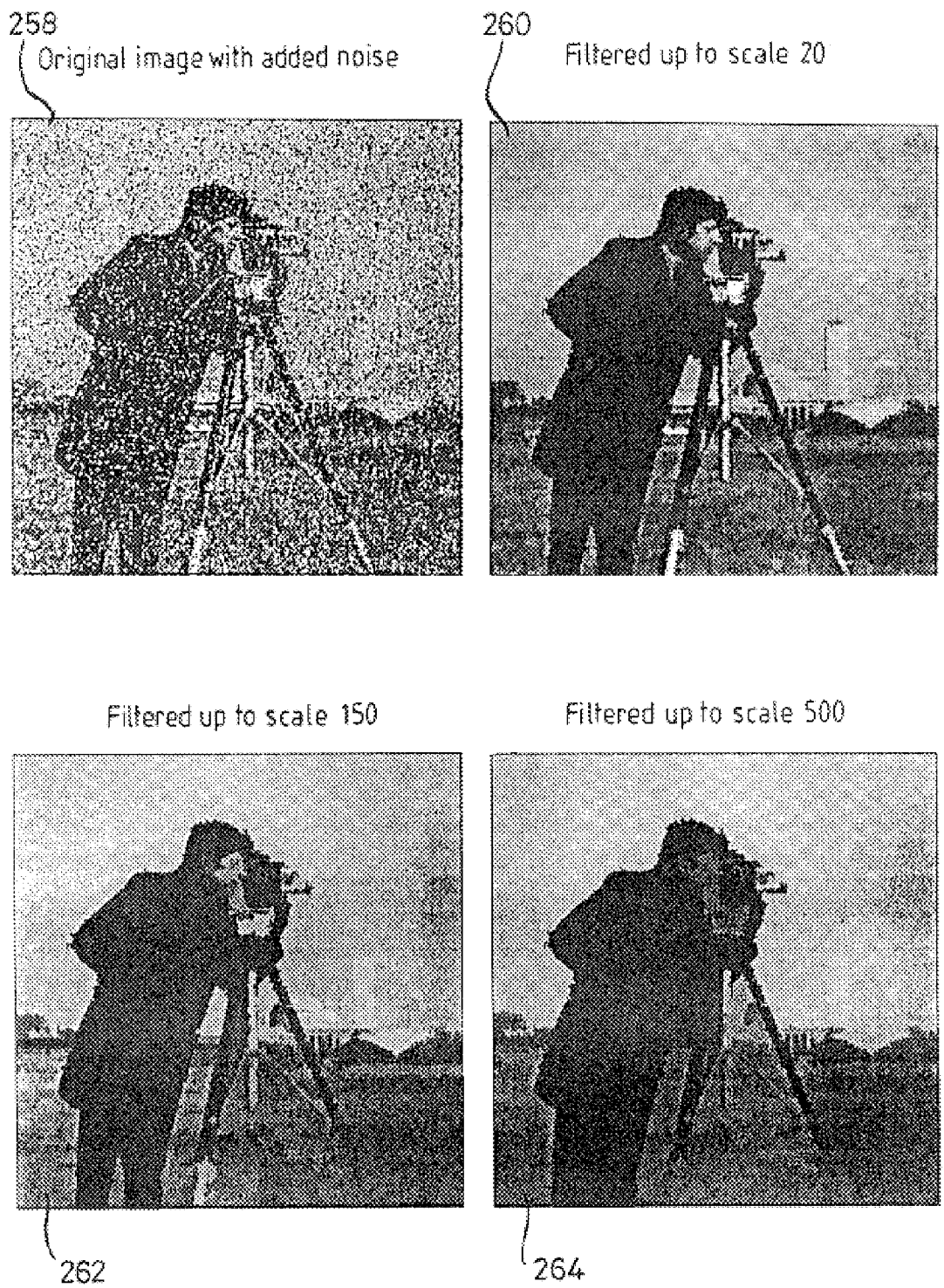
FIG. 6 is a corresponding view to FIG. 5, and shows the effect of filtering at different scales on noise in the original image.

FIG. 6 shows similar processing applied to an original image that has been heavily corrupted by noise. The original, corrupted image is shown at 258, the same images filtered to remove connected-sets of twenty one hundred and fifty and five hundred pixels or less are denoted by reference numbers 260, 262 and 264 respectively.

It is apparent that the processing is able to reject the noise with only limited degradation of the features of interest in the image. Thus the processing is robust and enables degraded images to be handled.

Figure 7:
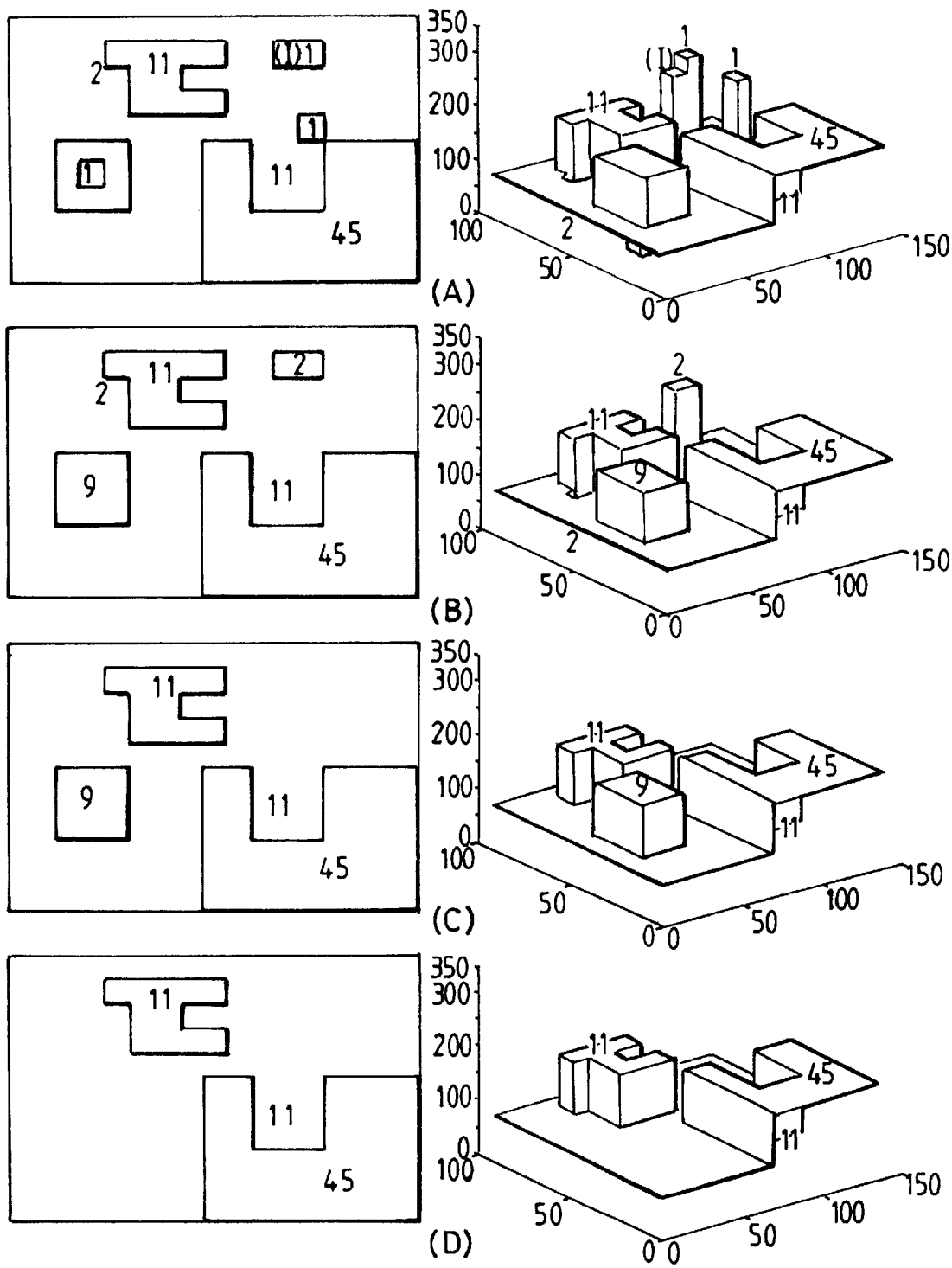
FIGS. 7A–7D are similar views to FIGS. 1A–1C, and show the effect that filtering at different scales has on a simplified two-dimensional image as shown in the left hand panels, the right hand panels being three dimensional graphic representations of the image at the corresponding filtering stages.

FIG. 7 is a second example of the filtering process applied to a two dimensional image. The left panel shows the image at different stages of sieving. The right panel shows the same images but as a surface relief, intensity being plotted upwards on the z axis. FIG. 7A (left panel) shows the image prior to filtering. Each area is a connected set of pixels having the same (or quantised to be the same) intensity. The number of pixels forming each local extrema is shown. There is one minimum of area 1 and two maxima. (I) is not an extremum, but what would have happened if it were a minimum will be considered presently. The maxima can also be seen in FIG. 7A (right panel). The first stage of the sieve is to remove all extrema of area 1 by assigning the pixels that form the extrema the value of the next most extreme neighbouring pixel. The result is shown in FIG. 7B. In this case the extrema can be removed in any order.

If pixel (I) had been a minimum then circuits that remove the extrema in different orders will give different results. There are several possibilities.

For example, either only the scale 1 minima are removed or only the maxima, as has been suggested in Vincent "Grayscale area openings and closings, their efficient implementation and applications", in ISBN 84-7653-271-7, p22–27. However, the apparatuses shown in FIGS. 2 and 3 can remove both at each scale, providing improved performance, with no significant computational penalty.

Two further methods remove the maxima and minima in any order, or in spatial order. The circuits needed to achieve this are relatively simple to implement.

FIG. 7C shows the result of the next stage of sieving in which both extremal areas up to 2 pixels have been removed. FIG. 7D shows the result of sieving to remove all extrema of areas up to 10 pixels.

Figure 8:
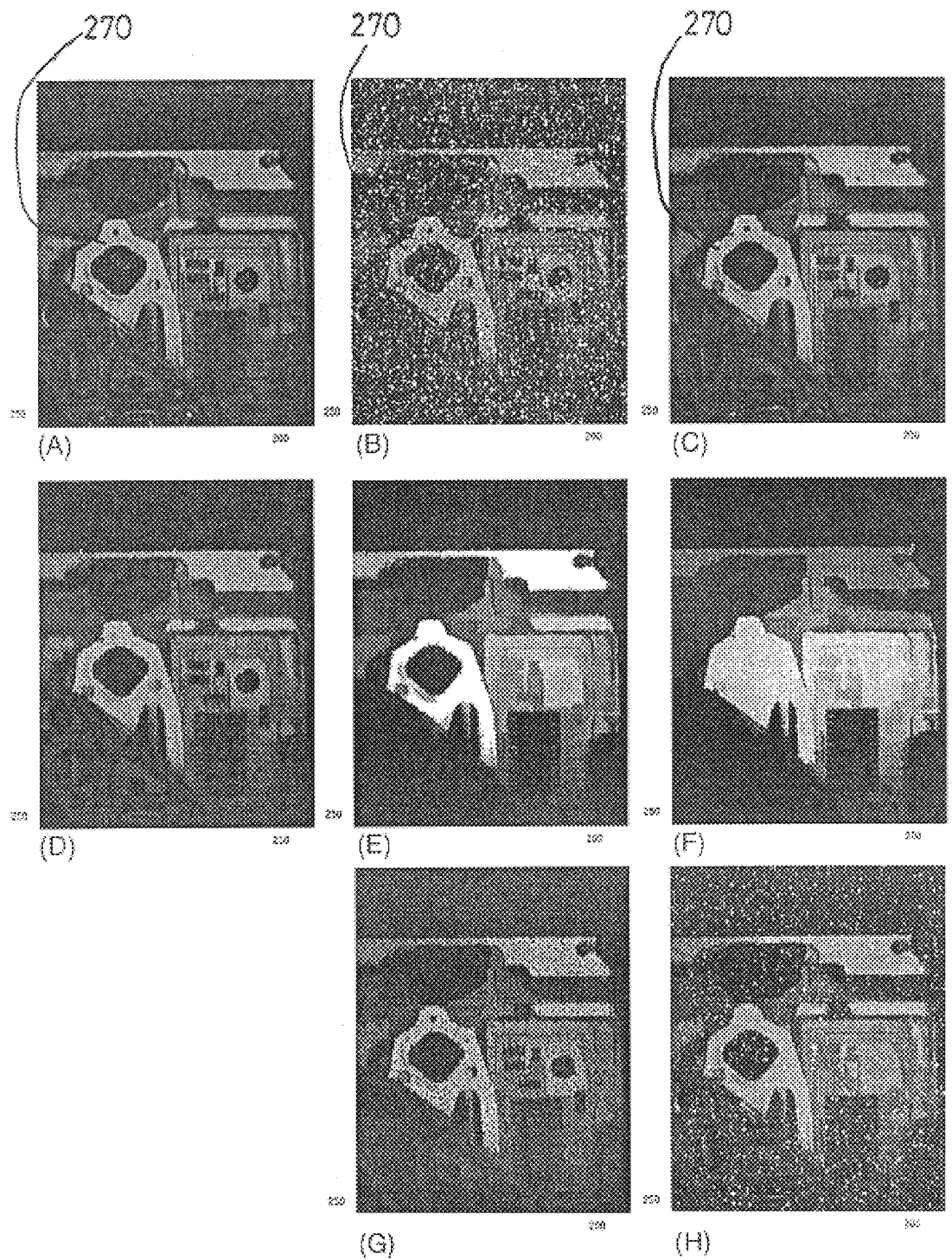
FIGS. 8A to 8H correspond to FIG. 6, and show images of part of a disc drive mechanism, before processing, after the addition of random amplitude noise, and after filtering at various scales.

FIG. 8A is an image of part of a disc drive mechanism. FIG. 8B shows the same image with the addition of 10% random amplitude noise. FIG. 8C shows the image of FIG. 8B after area sieving to remove all extrema of area less than 5 pixels. The sieve uses a single pass at each stage that removes both maxima and minima in a convenient order.

In an alternative implementation all maxima at each stage could be removed before all minima at the same stage.

FIG. 8D shows the image of FIG. 8B after area sieving to remove all extrema of area less than 30 pixels. Notice that the small screw hole (at x=56, y=110 referenced 270) and other small objects have been removed. FIG. 8E shows the image of FIG. 8B after area sieving to remove all extrema of area less than 300 pixels. Notice that larger objects have been filtered out.

FIG. 8F shows the image of FIG. 8B after area sieving to remove all extrema of area less than 5000 pixels. Notice that not only have small objects been removed but the edges of large objects have been preserved.

FIGS. 8G and 8H respectively show images obtained after opening and closing filtering to remove only maxima or minima. As can be seen, some residual noise escapes each of the filtering stages shown in FIGS. 8G and 8H.

Figure 9:
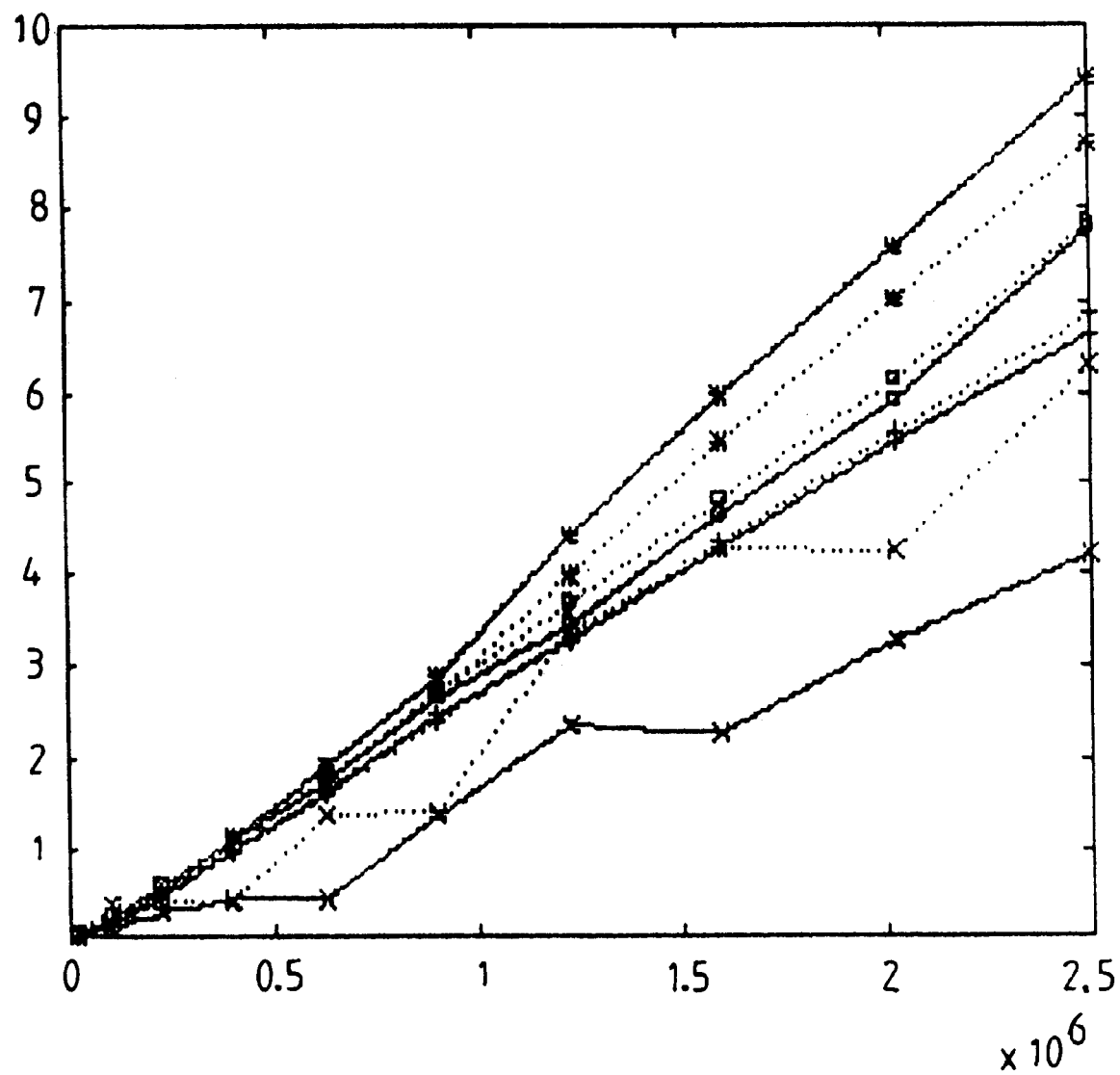
FIG. 9 is a number of graphs, on common axes, of computation time against number of image pixels processed by the filtering method when applied to various different images.

The graphs of FIG. 9 illustrate the performance of the apparatuses shown in FIGS. 2 and 3 for various different images. Each graph is a plot of the number of pixels (abscissa) of the image processed against the time (in seconds) taken (ordinate) to process them. The time taken also provides an indication of the necessary complexity of a circuit for processing an image in a predetermined time. The actual time spent completely transforming (ie processing) an image depends on the extent of detail in that image, which is why graphs for a number of different images are shown. However, the overall slopes of the graph are generally approximately linear (ie constant) over this range of image sizes, showing that, in practice, the circuit configuration described herein is both fast and simple.

Colour

In one application an area sieve is used to process colour images. Unlike many standard linear filters, sieves can be usefully applied to colour images in any representation, for example red, green, blue (RGB) or hue, saturation, value (HSV), without the colour bleeding through the edges of features. In the HSV representation, the hue is typically a value between 0 and 359 that represents an angle. As a result, red often lies either side of the boundary between 0 and 359. It is, therefore, a standard process to re-map (rotate) the colour signal so that the colour of interest is associated with a value not near the boundary. Consider an example in which a coloured car is located in an image. The colour image is converted from RGB to HSV and the hue signal is re-mapped (rotated) to take the value representing the desired colour away from the 0 359 boundary. It is then found that segments of the image that are of the desired colour form a maximum in the hue signal. If there are no other objects of the desired colour in the image then this alone is enough to allow the desired car to be localised.

If, as is more usual, there are many objects of the same or related colours, then it is necessary to use an additional method to localise the desired feature. The invention provides such a method, and uses the number of pixels that represent the desired feature, namely the area, further to narrow down the number of possible regions that might represent the desired feature. Thus, the remapped hue signal is sieved by a method according to the invention to remove all those features of the wrong area. The resulting signal concentrates information about the position of the desired feature.

Figure 10:
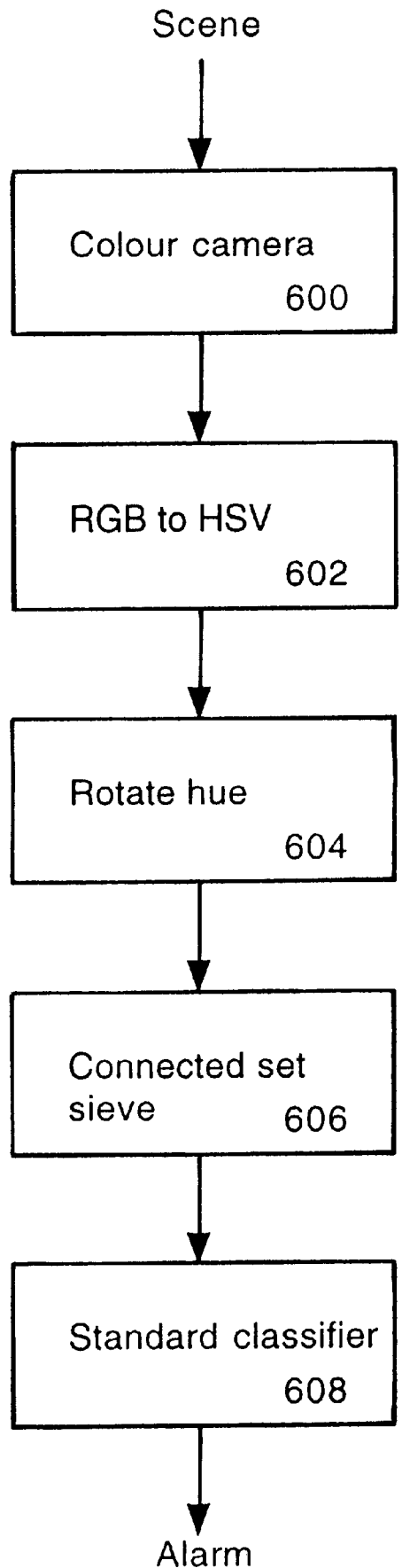
FIG. 10 shows apparatus, which includes apparatus such as is shown in FIG. 2 or FIG. 3, for recognising objects, in this case cars, of a selected colour.
Figure 11A:
FIG. 11A shows an image an be processed by the apparatus of FIG. 10, and FIGS. 11B–11C show the effect of two stages of that processing on the image.
Figures 11B, 11C:
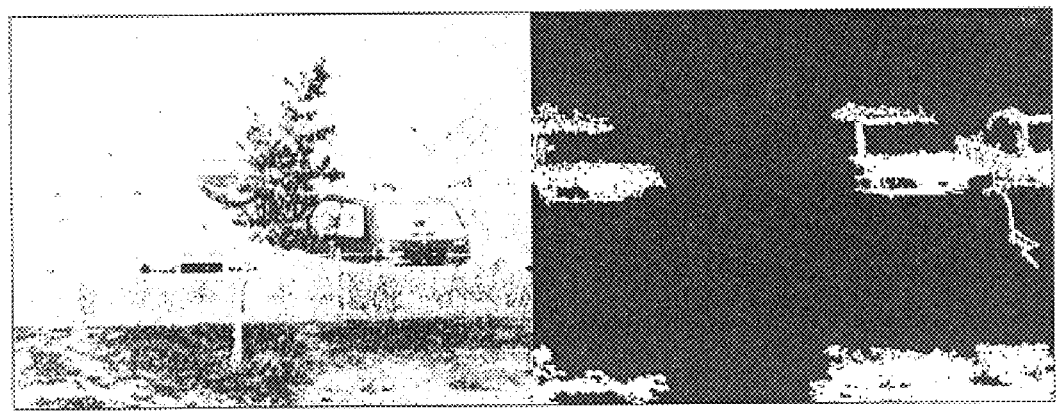

The process is illustrated in FIG. 10. A camera 600 digitises the scene. An example of digitised image is shown in FIG. 11A. The feature of interest is a red car. A standard RGB to HSV converter 602 produces the hue signal in which the intensity of red objects is maximised. A standard look-up table 604 is used to rotate the hue signal so that the colour of interest is centred midway between the two extreme value the signal can take. An example of the resultant image is shown in FIG. 11B. This has too much detail for the desired car to be identified, therefore it is sieved in circuit 606 (which comprises either the apparatus of FIG. 2 or that of FIG. 3) that rejects all segments that are either of too small an area or too large. An example of the "band-pass" sieved image is shown in FIG. 11C. It is clear that the ratio of segments that are of interest compared to those that are not, is increased by the sieve 606. In a similar fashion, the sieve can be applied to the other domains that represent a colour image.

Figures 12A, 12B:
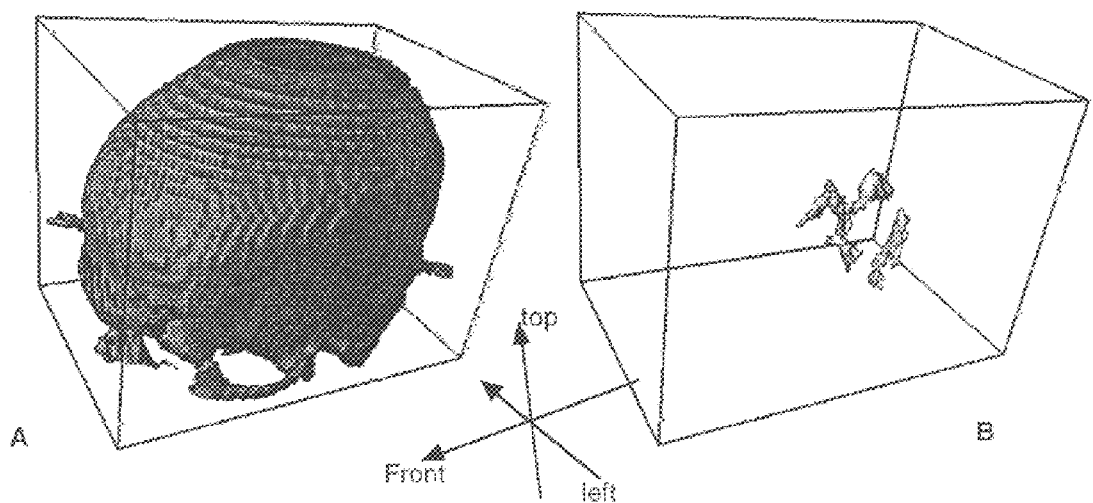
FIGS. 12A–12B illustrate the processing of a three dimensional image by a method in accordance with the present invention.

FIG. 12 illustrates the application of the method of the invention by the filtering of images in three dimensions, in this case, in order more clearly to visualise internal features of a skull. In other examples, it can be used with ultrasound to visualise the internal structure of metal welds. FIG. 12A shows a view of a skull. It is obtained from a series of computed tomography images that have been volume sieved to delete all volumes outside the range of volumes that include the bone that forms the connected-set that represents the skull. FIG. 12B shows the result of applying a combination of 2 and 3 dimensional sieves to extract the volume associated with the third ventricle of the brain.

We claim:

1. A method for filtering a signal representative of features in a space of two dimensions, the signal comprising a plurality of data samples, each having a value representative of a predetermined parameter of the signal for a respective region of said space, the method comprising the steps of:
   (a) progressively filtering the signal at monotonically increasing filtering scales from S1 up to S2, the input signal to the first filtering scale being the original input signal to the filtering process, while the input signal to the or each subsequent filtering scale is the output signal from the previous filtering scale;
   (b) at each filtering scale,
      i) identifying one or more connected-sets, each of either a plurality of adjoining data samples having substantially the same value or values lying in a predetermined range or a single respective data sample not in any other set, each set thus having a value equal to the value of the or all the data samples therein or, where the values lie in said range, the average of the values of the data samples therein; and
      ii) selecting each of those collected-sets which has an area related in a predetermined way to the current filtering scale and which has a value that is a local maximum or a local minimum compared with those of adjacent connected sets,
   and for each selected connected-set,
   (c) identifying the adjacent connected-set whose value is closest to the current value of the selected set;
   (d) so modifying the value of the selected set that the new value is equal to that of the adjacent connected-set identified in step (c) so that the adjacent connected-set becomes merged with the selected connected-set, thereby forming an extended connected-set of larger area; and
   outputting an output signal from at least one of the filtering scales, wherein for at least one of such filtering scales, both connected-sets having local maxima and connected-sets having local minima are selected.

2. A method according to claim 1 in which both connected-sets having local maxima values and connected-sets having local minima values are selected at each filtering scale.

3. A method according to claim 1, in which the method further comprises the step of outputting a further signal representative of parameters describing a "granule" represents the share of the originally selected sets and the change in value of those sets due to said modification.

4. A method according to claim 1, in which a respective output signal is output from each filtering scale once all the connected-sets selected at that scale have been processed.

5. A method according to claim 1 in which the signal is representative of an image containing a number of objects represented by local maxima and minima in the values of the data samples for the regions occupied by the objects, each object being removed from the image if a filtering scale related criterion is satisfied by the area of the object.

6. A method according to claim 5 in which said criterion is satisfied if the area of the object is equal to an "area equivalent" associated with the filtering scale.

7. A method according to claim 5 or claim 6 in which the criterion is satisfied if the area of the object is less than an "area equivalent" associated with the filtering scale.

8. A method according to claim 5 or claim 6 in which said criterion is satisfied if the area of the object is greater than an "area equivalent" associated with the filtering scale.

9. A method according to claim 1 in which the signal is an image signal, the value of each data sample representing the intensity and/or colour of a respective pixel.

10. A method according to claim 1 in which the number of data samples in a connected-set is used as a measure of the area of volume of the composite region represented by that set.

11. A method according to claim 1 in which the value of each selected connected-set is only modified at a given filtering scale if that value satisfies a predetermined further criterion.

12. A method according to claim 11 in which said further criterion is based on the difference between the value of the selected connected-set under consideration, and the value of an adjacent connected-set having the closest value to that of the set under consideration.

13. A method according to claim 12 in which said values represent amplitudes or intensities, the further criterion therefore being the contrast between the connected-set under consideration and the surrounding connected-sets.

14. A method according to claim 1 in which, if said adjacent connected-set having a value which is closest to that of the selected set is one of a plurality of such adjacent connected-sets, either all such connected-sets are merged with the selected connected-set to form a single composite set whose area is the sum of the areas of all the merged connected-sets, or only one such adjacent connected-set is merged with the selected connected-set at that filtering scale, with the or each other such adjacent connected-set being merged at higher filtering scales.

15. A method according to claim 14, in which, at a given filtering scale, the selected connected-set is merged with all adjacent connected-sets having values which lie within a predetermined range of values which includes the value of the selected connected-set.

16. A method according to claim 1 in which the method further comprises the steps of subtracting an output signal of one filtering scale from an output signal of a different filtering scale and outputting the difference to any subsequent processing or to a display, the method thereby separating features in a certain range of sizes from other features.

17. A method according to claim 1, in which the method further comprises the steps of subtracting the output signal of one filtering scale from the input signal to that scale, and outputting the difference to any subsequent processing or to a display, the method thereby removing larger scale features.

18. A method according to claim 1, in which the method further comprises the steps of outputting signals from a number of filtering scales, each said signal describing the location and/or change in value of any selected connected-sets that were processed at the corresponding scale, and passing the signals to any subsequent processing or to a display, the method thereby decomposing the signal by placing features into different groups, each of which contains only features of a respective size or a size lying within a respective range of sizes.

19. A method according to claim 1 in which, at any filtering scale, the selected sets are processed in the order in which they appeared in the input signal to that filtering scale.

20. A method according to claim 1 in which, at any filtering scale, all the selected connected-sets which represent local maxima are processed before those representing local minima, or vice-versa.

21. A method according to claim 1, in which said modifications to the values of selected connected-sets are made directly to the input data for a filtering scale, and are not stored in a separate output buffer.

22. A method for filtering a signal representative of features in a space of three dimensions, the signal comprising a plurality of data samples, each having a value representative of a predetermined parameter of the signal for a respective region of said space, the method comprising the steps of:

(a) progressively filtering the signal at monotonically increasing filtering scales from S1 up to S2, the input signal to the first filtering scale being the original input signal to the filtering process, while the input signal to the or each subsequent filtering scale is the output signal from the previous filtering scale;

(b) at each filtering scale, i) identifying one or more connected-sets, each of either a plurality of adjoining data samples having substantially the same value or values lying in a predetermined range or a single respective data sample not in any other set, each set thus having a value equal to the value of the or all the data samples therein or, where the values lie in said range, the average of the values of the data samples therein; and ii) selecting each of those collected-sets which has a volume related in a predetermined way to the current filtering scale and which has a value that is a local maximum or a local minimum compared with those of adjacent connected sets, and for each selected connected-set, (c) identifying the adjacent connected-set whose value is closest to the current value of the selected set;

(d) so modifying the value of the selected connected-set that the new value is equal to that of the adjacent connected-set identified in step (c) so that the adjacent connected-set becomes merged with the selected connected-set, thereby forming an extended connected-set of larger volume; and outputting an output signal from at least one of the filtering scales, wherein for at least one of such filtering scales, both connected-sets having local maxima and connected-sets having local minima are selected.

23. A method for filtering a signal representative of features in a space of two or more dimensions, the signal comprising a plurality of data samples each having a value representative of a predetermined parameter of the signal for a respective region of said space, the method comprising the following steps:

(a) progressively filtering the signal at monotonically increasing filtering scales from S1 up to S2, the input signal to the first filtering scale being the original input signal to the filtering process, while the input signal to the or each subsequent filtering scale is the output signal from the previous filtering scale;

(b) at each filtering scale, i) identifying one or more connected-sets, each of either a plurality of adjoining data samples having substantially the same value or values lying in a predetermined range or a single respective data sample not in any other set, each set thus having a value equal to the value of the or all the data samples therein or, where the values lie in said range, the average of the values of the data samples therein; and ii) selecting each of those collected-sets which has a size and/or colour, a parameter or combination of parameters of which is related in a predetermined way to the current filtering scale and which has a value that is a local maximum or a local minimum compared with those of adjacent connected sets, and for each selected connected-set, (c) identifying the adjacent connected-set whose value is closest to the current value of the selected set;

(d) so modifying the value of the selected connected-set that the new value is equal to that of the adjacent connected-set identified in step (c) so that the adjacent connected-set becomes merged with the selected connected-set, thereby forming an extended connected-set of larger size; and outputting the output signal from at least one of the filtering scales, wherein for at least one of such filtering scales, both connected-sets having local maxima and connected-sets having local minima are selected.

24. A method according to claim 23 in which, in step (b) a single parameter, related to the size of a region represented by a connected-set is considered, and in which said single parameter comprises any one of the perimeter, width, height, moment about some point, greatest distance between any two points or geodesic distance.

25. A method according to claim 24 in which the distance, perimeter, width, height or depth of a composite region are determined by counting the number of data samples in the connected-set representing that region.

26. A method according to claim 23 in which step (b) involves a consideration of a combination of parameters relating to the size of the region represented by a connected-set, and in which said combination comprises any one or more of the perimeter, width, height, moments about some point, greatest distance between any two points or geodesic distance of the composite region.

27. Apparatus for filtering a signal, the apparatus comprising:

(a) first circuit means for identifying connected-sets in an input signal;

(b) comparator circuit means for determining whether the value of a connected-set is a local maximum or minimum by comparing that value with the value of adjacent connected-sets;

(c) integration circuit means for determining one or more parameters related to the sizes of connected sets whose value is a local maximum or local minimum;

(d) selection circuit means for comparing said parameter or parameters with a filtering scale thereby to determine whether such connected-sets require processing;

(e) means for reading the values of the connected-sets that are adjacent to selected connected-sets;

(f) further comparator means for determining which adjacent connected-set is closest in value to that of any selected connected-set;

(g) means for modifying the value of a selected connected-set to that of the closest value adjacent connected-set;

(h) output means for outputting a signal following filtering at a predetermined scale; and (i) means for determining when processing is finished.

28. Apparatus according to claim 27, in which the apparatus includes input and output buffers, control circuitry and additional memory for storing intermediate results and other information used in the processing.

29. Apparatus according to claim 28, in which the apparatus includes additional storage means for storing information that describes the local maxima and minima found in the signal.

30. Apparatus according to claim 29, in which the storage means is used to hold any or all of the following data: the location of at least one of the data samples having a local maximum or minimum value; a list of the locations of all such data samples in a connected-set; the area of such a set; the value of the data samples in the set; a list of other connected-sets or data samples that are adjacent to said connected-set; a flag that indicates whether each maximum or minimum value is a maximum or a minimum.

31. Apparatus according to claim 30, in which the storage means stores information on connected-sets of data samples having local maximum values in one list and sets of samples having local minimum values in another list.

32. Apparatus according to claim 29, in which, in order to further improve processing speed, the apparatus includes additional storage means for storing information that describes the connected-sets found in the signal.

33. Apparatus according to claim 32, in which the storage means is used to hold any or all of the following data: the location of at least one of the data samples in the connected-set; a list of the locations of all the data samples in the connected-set; the area of the connected-set the value of the connected-set; a list of other connected-sets or data samples that are adjacent to the connected-set; a list of data samples that are contained within the connected-set and lie along the perimeter of the connected-set, possibly including a flag for each such data sample to indicate in which direction a data sample from a neighbouring connected-set can be found.

34. Apparatus according to claim 32, in which, in order further to improve processing speed, further additional storage means is provided in order to identify the connected-set to which each data sample in the signal belongs at each stage in the processing.

35. Apparatus according to claim 27, in which the means for determining when processing is finished comprises a counter for holding the current filtering scale and means for comparing the current filtering scale with the maximum filtering scale.

36. Apparatus according to claim 27, in which the means for determining when processing is finished comprises means for determining the minimum area of any selected connected-set or composite connected-set formed by merging selected connected-sets with adjacent connected-sets and means for comparing this area with the maximum filtering scale.

37. Apparatus according to claim 27, in which the selection circuit means comprises means for comparing the total area of the region or composite region represented by any connected-set with a filtering scale, the integration circuit means being operable to determine the total areas represented by connected-sets.

38. Apparatus according to claim 37, in which the selection circuit means further comprises means for holding connected-sets, having values which are local maxima or minima, of different areas in different lists, such that only the list corresponding to a particular scale needs to be processed at that scale.

39. Apparatus according to claim 27, in which the output means employs a comparator to determine when the desired filtering scale has been reached.

40. Apparatus according to claim 27, in which the selection circuit means comprises means for comparing one or more of perimeter, width, height, moments about some point, greatest distance between any two points in the region, geodesic distance with a filtering scale, the integration circuit means being operable to determine said one or more parameters for connected-sets.

41. Apparatus according to claim 27, in which the selection circuit means is also operable to compare the value of data samples in a given set with those of samples in adjacent connected regions to determine whether the connected-set being tested should be processed at a given filtering scale.

* * * * *